US010070265B1

(12) United States Patent
Maricic et al.

(10) Patent No.: US 10,070,265 B1
(45) Date of Patent: Sep. 4, 2018

(54) SYSTEM FOR SELECTIVE ACCURACY OF AN INDOOR POSITIONING SYSTEM

(71) Applicant: General Electric Company, Schenectady, NY (US)

(72) Inventors: Danijel Maricic, Niskayuna, NY (US); John Erik Hershey, Ballston Lake, NY (US); Michael James Hartman, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 15/477,849

(22) Filed: Apr. 3, 2017

(51) Int. Cl.
*H04W 4/04* (2009.01)
*H04L 29/08* (2006.01)

(52) U.S. Cl.
CPC .............. *H04W 4/04* (2013.01); *H04L 67/02* (2013.01); *H04L 67/141* (2013.01); *H04L 67/18* (2013.01)

(58) Field of Classification Search
CPC .......... H04W 4/04; H04L 67/18; H04L 29/08; H04L 67/02; H04L 67/141
See application file for complete search history.

(56) References Cited

U.S. PATENT DOCUMENTS

| | | | |
|---|---|---|---|
| 4,691,341 A | 9/1987 | Knoble et al. | |
| 6,360,090 B1 | 3/2002 | Holcombe et al. | |
| 7,148,458 B2 | 12/2006 | Schell et al. | |
| 7,952,319 B2 | 5/2011 | Lowenthal et al. | |
| 8,792,906 B2 | 7/2014 | Batada et al. | |
| 8,994,814 B2 | 3/2015 | Ganick et al. | |
| 9,048,880 B2 | 6/2015 | Batada et al. | |
| 9,287,976 B2 | 3/2016 | Ganick et al. | |

(Continued)

FOREIGN PATENT DOCUMENTS

WO 2015161862 A1 10/2015

OTHER PUBLICATIONS

Chawathe, "Beacon Placement for Indoor Localization using Bluetooth", Intelligent Transportation Systems, 2008. ITSC 2008. 11th International IEEE Conference, http://dx.doi.org/10.1109/ITSC.2008.4732690, Oct. 12-15, 2008.

(Continued)

*Primary Examiner* — Frantz Bataille
(74) *Attorney, Agent, or Firm* — GE Global Patent Operation; Nitin Joshi

(57) ABSTRACT

A beacon location system includes a plurality of first broadcasters configured to broadcast first broadcasts to be received by a registered receiver device, and includes one or more second broadcasters configured to broadcast second broadcasts to be received by the registered receiver device. The beacon location system includes a controller communicatively and operatively coupled to the plurality of first broadcasters, and the one or more second broadcasters, wherein the controller comprises a memory and a processor configured to execute instructions stored on the memory. The instructions include generating one or more masked correspondences between the first broadcasts and locations of the plurality of the first broadcasters, wherein the one or more masked correspondences comprise one or more levels of accuracies. The beacon location system also includes a website accessible to the registered receiver device to obtain the one or more masked correspondences.

20 Claims, 6 Drawing Sheets

(56) References Cited

U.S. PATENT DOCUMENTS

| | | | |
|---|---|---|---|
| 9,335,179 | B2 | 5/2016 | Penilla et al. |
| 2006/0095348 | A1 | 5/2006 | Jones et al. |
| 2012/0029817 | A1 | 2/2012 | Khorashadi et al. |
| 2012/0086560 | A1 | 4/2012 | Ilyes et al. |
| 2012/0185105 | A1 | 7/2012 | McMullin |
| 2013/0103378 | A1 | 4/2013 | Tinnakornsrisuphap et al. |
| 2013/0260792 | A1* | 10/2013 | Johnson, Jr. .......... G06K 7/0095 455/456.1 |
| 2014/0153923 | A1 | 6/2014 | Casaccia et al. |
| 2014/0162701 | A1* | 6/2014 | Jellinek ................ H04W 4/023 455/456.6 |
| 2014/0220883 | A1 | 8/2014 | Emigh et al. |
| 2015/0235161 | A1 | 8/2015 | Azar et al. |
| 2015/0308835 | A1 | 10/2015 | Hansen et al. |
| 2015/0341754 | A1 | 11/2015 | Gooch |
| 2017/0079001 | A1* | 3/2017 | Lewis .................. H04W 64/00 |

OTHER PUBLICATIONS

"Indoor Positioning Systems based on BLE Beacons—Basics", Locatify, https://locatify.com/blog/indoor-positioning-systems-ble-beacons/, 2015.

U.S. Appl. No. 15/276,167, filed Sep. 26, 2016, Danijel Maricic.

Liu et al,. "Positioning Beacon System Using Digital Camera and LEDs", IEEE Transactions on Vehicular Technology, vol. No. 52, Issue No. 02, pp. 406-419, Mar. 2003.

Qian et al., "Load Model for Prediction of Electric Vehicle Charging Demand", International Conference on Power System Technology, pp. 1-6, 2010.

Erol-Kantarci et al., "Communication-Based Plug-In Hybrid Electrical Vehicle Load Management in the Smart Grid", IEEE. pp. 404-409, 2011.

Rajagopai et al., "IEEE 802.15.7 Visible Light Communication: Modulation Schemes and Dimming Support", IEEE Communications Magazine, pp. 72-82, Mar. 2012.

Hill et al., "Monitoring and Predicting Charging Behaviour for Electric Vehicles", Intelligent Vehicles Symposium Alcalá de Henares, pp. 914-919, Jun. 3-7, 2012.

Li et al., "Epsilon: A Visible Light Based Positioning System", 11th USENIX Symposium on Networked Systems Design and Implementation (NSDI '14), pp. 1-14, Apr. 2-4, 2014.

Xydas et al., "A Data-Driven Approach for Characterising the Charging Demand of Electric Vehicles: A UK Case Study", Applied Energy, vol. No. 162, pp. 763-771, 2016.

Steenbrink et al., "Predicting the Demand tor Charging Stations for Electric Vehicles", Special Theme: Logistics and Planning. p. 22, Apr. 2016.

Cailean et al., "Toward Environmental-Adaptive Visible Light Communications Receivers for Automotive Applications: A Review", IEEE Sensors Journal, vol. No. 16, Issue No. 09, pp. 2803-2811, May 1, 2016.

Do et al., "An in-Depth Survey of Visible Light Communication Based Positioning Systems" Sensors, pp. 1-40, May 2016.

U.S. Appl. No. 15/454,936, filed Mar. 9, 2017.

* cited by examiner

US 10,070,265 B1

SYSTEM FOR SELECTIVE ACCURACY OF AN INDOOR POSITIONING SYSTEM

BACKGROUND

The subject matter disclosed herein relates generally to location tracking, and more particularly, to systems and methods for location tracking based on beacons.

Location or position tracking using beacons may help guide navigations. For example, in an indoor facility or space, such as a commercial retail establishment, an indoor positioning system may be based on radio frequency (RF), visible light, and/or acoustic beacons. The location of an object equipped with a suitable beacon receiver (e.g., one or more sensors, a smartphone) can be computed from the signals received from one or more anchor node beacons or beacons (RF beacons, visible light beacons, acoustic beacons, or any suitable beacons). The information captured from the beacons may include beacon signal strength, image of the beacon, and the data or code emitted by the beacons. The location computation is based on the beacon information captured at a given location and matched with mapping information about the indoor facility. This mapping information may include the map of the respective indoor facility, the location of the beacons in the facility, and the beacon codes for each of the beacons. The precision of the location tracking system may depend at least in part on the data or information received by the beacon receiver. For example, navigation based on the location tracking system may offer higher precision or resolution if the information received by the beacon receiver is more accurate (e.g., less degradation), and vice versa.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, a beacon location system includes a plurality of first broadcasters configured to broadcast first broadcasts to be received by a registered receiver device, and includes one or more second broadcasters configured to broadcast second broadcasts to be received by the registered receiver device. The beacon location system includes a controller communicatively and operatively coupled to the plurality of first broadcasters, and the one or more second broadcasters, wherein the controller comprises a memory and a processor configured to execute instructions stored on the memory. The instructions include generating one or more masked correspondences between the first broadcasts and locations of the plurality of the first broadcasters, wherein the one or more masked correspondences comprise one or more levels of accuracies. The instructions also include controlling operation of the plurality of first broadcasters and controlling operation of the one or more second broadcasters. The beacon location system also includes a website accessible to the registered receiver device to obtain the one or more masked correspondences.

In another embodiment, a method for providing location includes providing a plurality of location beacons configured to broadcast first signals to be received by one or more registered receiver devices. The method includes providing one or more broadcasters configured to broadcast second signals to be received by the one or more registered receiver devices. The method includes providing a controller operatively coupled to the plurality of location beacons and the one or more broadcasters. The method includes providing a website communicatively coupled to the controller and accessible to the one or more registered receiver devices. The method also includes generating one or more masked correspondences between the first signals and locations of the plurality of location beacons. The one or more masked correspondences include one or more levels of accuracies and are obtainable by the one or more registered receiver devices through the website.

In another embodiment, a location beacon controller includes a memory encoding one or more processor-executable routines, and a processor programmed to access and execute the one or more routines encoded by the memory. The routines, when executed, cause the processor: to broadcast first broadcasts via a plurality of first broadcasters, to broadcast second broadcasts via one or more second broadcasters, and to generate one or more masked correspondences between the first broadcasts and the locations of the plurality of the first broadcasters. The one or more masked correspondence includes a present masked correspondence replaceable by a subsequent masked correspondence, and the one or more masked correspondences includes one or more levels of accuracies.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure relates to a location beacon system that provides location (e.g., positions and/or orientations) information with selective accuracy to users having suitable receiver devices (e.g., sensor, smartphone). In particular, the location beacon system may provide at least two accuracy or quality levels to registered users. For example, in a commercial retail establishment, a registered user selecting a higher level of accuracy may receive higher resolution navigation and/or more detailed navigation information.

Figure 1:
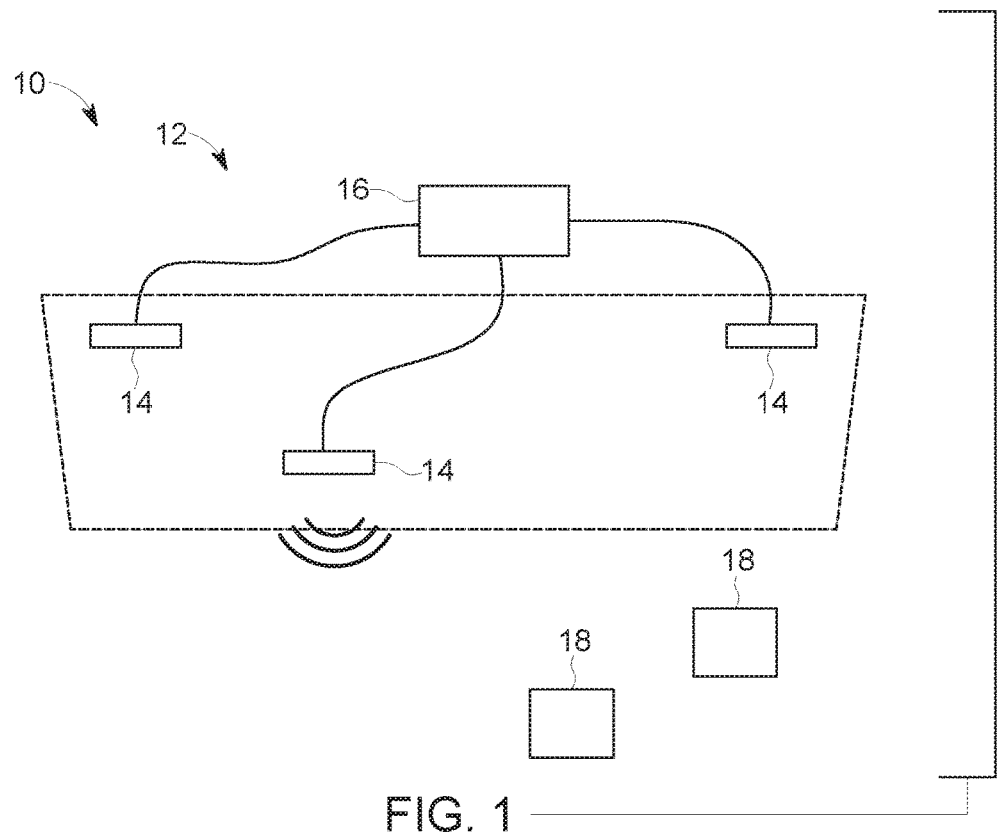
FIG. 1 is an example diagram of a facility having a location beacon system broadcasting geolocation information to a receiver device, in accordance with an aspect of the present disclosure.

With the foregoing mind, it may be useful to describe an embodiment of a facility 10 that may employ a position tracking system or a location beacon system 12, as depicted in FIG. 1. The facility 10 may be an indoor facility, such as a commercial retail establishment, a store, a shopping center, or any other indoor facility for similar industrial and/or commercial application. As further depicted in FIG. 1, the location beacon system 12 may include one or more location beacons 14 (e.g., first broadcasters) and a controller 16 operatively coupled to the one or more location beacons 14. The one or more beacons 14 may be radio frequency (RF)-based, visible-light based, infrared (IR)-based, ultraviolet (UV)-based, or acoustic-based beacons, and may transmit or broadcast beacon data within the facility 10. In certain embodiments, the one or more location beacons 14 may be light fixtures or ceiling light fixtures configured to emit modulated light containing beacon data. The beacon data may include encoded beacon identity that serves to associate its optical transmissions with location (e.g., x-, y-, and z-coordinates) within the facility 10. The controller 16 may generate and communicate encoded beacon identity to the one or more location beacons 14.

The broadcasted beacon data may be received and processed by one or more registered receiver devices 18 to facilitate navigation in the facility 10. The receiver device 18 may be a mobile phone, a smartphone, or any suitable device having functionality to detect, receive, and process short range wireless (srw) signals and signals broadcasted by the one or more location beacons 14. As may be appreciated, such functionality set forth above may be implemented by hardware (e.g., an antenna, a transceiver, etc.), by software (e.g., a firmware, an application, an application portability profile or APP, etc.) or a combination thereof. The location computation may be performed by the one or more receiver devices 18 based on the beacon data received at a given location and matched with the mapping information of the facility 10 (e.g., mapping of the facility 10, mapping of the one or more location beacons 14).

In some embodiments, the one or more location beacons 14 may change the content of the encoded beacon identities on a periodic (e.g., hours, days) or non-periodic basis. As may be appreciated, since the encoded beacon identities are changing with time (e.g., periodically or non-periodically), each mapping information (e.g., mapping of the facility 10, mapping of the one or more location beacons 14) is only effective within an effective time period. This in turn may help protect the ownership of the location beacon system 12 by preventing an unauthorized user (e.g., an interloper) to build applications to use the same beacon infrastructure.

Table 1 illustrates an example of a mapping of the one or more location beacons 14 between their locations (e.g., physical locations in x-, y-, z-coordinates) and encoded beacon identifications. In particular, the mapping may be viewed as the permutation set forth in Table 1.

TABLE 1

Mapping between Beacon Locations and their Identities

| Beacon Location | Beacon Broadcast Identity |
| --- | --- |
| $(x_1, y_1)$ | $C_{\pi(1)}$ |
| $(x_2, y_2)$ | $C_{\pi(2)}$ |
| ... | ... |
| $(x_{N-1}, y_{N-1})$ | $C_{\pi(N-1)}$ |
| $(x_N, y_N)$ | $C_{\pi(N)}$ |

The column on the left lists time-invariant locations (e.g., x- and y-coordinates) of N number of location beacons 14 (e.g., number 1, 2, 3 ... N−1, and N), and the column on the right lists a permutation of the encoded beacon identities, broadcasted by N number of location beacons 14. As may be appreciated, the "permutation" herein refers to a set of varying encoded beacon identities (e.g., a way that the varying encoded beacon identities may be ordered or arranged). The mapping of the varying encoded beacon identities (e.g., changing with time), and the notation used is to be interpreted as follows: $[\pi(1), \pi(2), \ldots, \pi(N-1), \pi(N)]$ is a permutation of $[1, 2, \ldots, N-1, N]$. This permutation (e.g., permutation of N times) may be developed and communicated by the controller 16 to the one or more registered receiver devices 18. As such, only a registered user (e.g., registered receiver device 18) receiving the effective mapping of Table 1 (e.g., effective within a time period) may use the location beacon system 12 to navigate in the facility 10. In other words, without the mapping of Table 1, knowing only the locations of the location beacons 14 and/or the coded beacon identities, but not knowing how they correspond to one another, would not enable valid location computation.

In some embodiments, encoding the mapping of Table 1 may utilize a minimum of $\lceil \lg_2 N! \rceil$ bits, where $\lceil \cdot \rceil$ is interpreted to be the smallest integer greater than or equal to the argument. Encoding the mapping of Table 1 according to such binary representation may employ extensive computations involving a large number of integers. Alternatively, encoding of the mapping of Table 1 may be achieved in a relatively simpler manner to encode the broadcasted encoded beacon identities as they appear in a top-to-bottom order in the column on the left of Table 1. Each broadcasted encoded identity may utilize a minimum data or information of $\lceil \lg_2 N \rceil$ bits. As such, the communication of the N number of encoded beacon identifiers may utilize communicating data of $\lceil \lg_2 N \rceil$ bits. In this manner, although encoding the mapping 30 may include more bits than the minimum of $\lceil \lg_2 N! \rceil$ bits (e.g., a more complex binary representation), the increase in bits may not be significant with respect to the near field communication (NFC) data exchange. For example, if N=32, a minimum of $\lceil \lg_2 32! \rceil$=120 bits are used to specify the mapping of Table 1. Alternatively, another way of encoding the mapping 30 may use $32\lceil \lg_2 32 \rceil$=160 bits, which is only 40 bits more than the minimum number of bits used.

Figure 2:
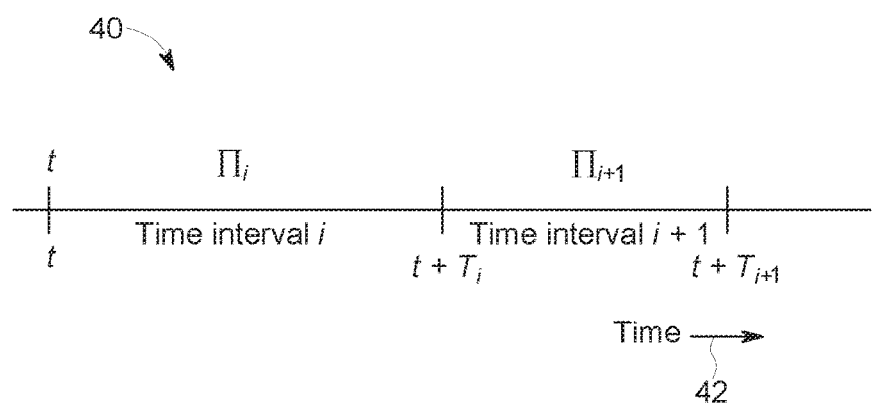
FIG. 2 is a chart illustrating that the beacon encoded information of the location beacon system of FIG. 1 changes as a function of time, in accordance with an aspect of the present disclosure.

As set forth above, the encoded beacon identities may change periodically (e.g., hours, days) or non-periodically. FIG. 2 is an example of a chart 40 illustrating the beacon encoded information (e.g., encoded beacon identities) changing as a function of time. In the illustrated embodiment, the horizontal axis 42 represents time (t) that stretches from time=t, t+$T_i$, t+$T_{i+1}$, and so forth with continuous "time intervals" or "stretches of time" as indicated by $T_i$, $T_{i+1}$, and so forth. The time intervals may be a constant value or non-constant values. For example, $T_i$ may be equal to $T_{i+1}$, or $T_i$ may be less than or greater than $T_{i+1}$. The location beacon system 12 uses a new mapping (e.g., the mapping of Table 1 is updated) at each beginning of a new time interval. For example, each new mapping (e.g., mapping of Table 1) is generated or made available at time=t, t+$T_i$, t+$T_{i+1}$, and so forth, such that the permutation of the encoded bacon identities $\Pi_i$ is in effect during the time interval $T_i$, the permutation of the encoded beacon identities $\Pi_{i+1}$ is in effect during the time interval $T_{i+1}$, and so forth.

With the foregoing in mind, a user may utilize the location beacon system 12 only if the user is provided with effective mapping information (e.g., mapping of the facility 10, mapping of the one or more location beacons 14). As an example, a user may utilize the location beacon system 12 by using a suitable user device (e.g., receiver device 18) to receive an application portability profile (APP) from a website. The APP is configured to enable a user device (e.g., receiver device 18) to make use of the permutation in effect during a given interval along with the beacon information to allow the user device (e.g., receiver device 18) to determine its position within the facility 10, such as a commercial retail establishment. The user device (e.g., receiver device 18) may be a mobile phone, a smartphone, or any suitable device having functionality to detect, receive, and process srw signals and signals broadcast by the one or more location beacons 14. The functionality to detect, receive, and process signals by the user device as it traverses the facility 10 may be implemented by hardware (e.g., an antenna, a transceiver, etc.), by software (e.g., a firmware, an application, an application portability profile or APP, etc.) or a combination thereof. In some embodiments, the APP may be downloaded by any users (e.g., registered and non-registered users). In some embodiments, the APP may be downloaded by only registered or authorized users, or users having their devices (e.g., receiver devices 18) registered with the location beacon system 12 (e.g., through a website).

Figure 3:
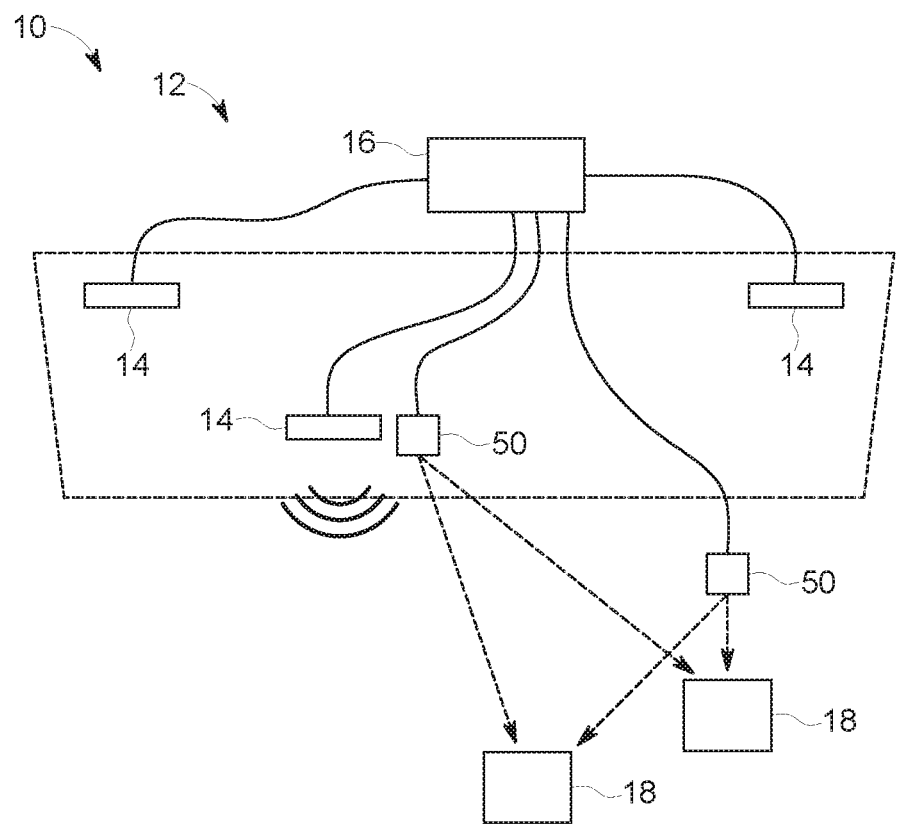
FIG. 3 is an example diagram of the location beacon system of FIG. 1 communicating the beacon encoded information and a short range wireless (srw) signal to the registered receiver device, in accordance with an aspect of the present disclosure.

In addition, registered users may have the option to select at least two different levels of accuracy for the location beacon system 12. In some embodiments, a higher level of accuracy may correspond to higher resolution and/or more detailed navigation information. FIG. 3 shows an example diagram of the location beacon system 12 with selective accuracy. As set forth above, the location beacon system 12 may include the controller 16 operatively coupled to the one or more location beacons 14. The controller 16 may generate and communicate encoded beacon identity to each of the one or more location beacons 14. The one or more location beacons 14 may broadcast the beacon data within the facility 10. The broadcasted beacon data may be received and processed by one or more registered receiver devices 18 to facilitate navigation in the facility 10. The location beacon system 12 with selective accuracy may include one or more short range wireless (srw) signal broadcast devices 50 (e.g., second broadcasters) operatively coupled to the controller 16 and configured to broadcast srw signals to the one or more registered receiver devices 18. The one or more srw signal broadcast devices 50 may be located proximate to the one or more location beacons 14 (e.g., first broadcasters) and/or any suitable locations within the facility 10. The srw signals are low power communications and only the registered receiver devices 18 within the facility 10 may receive the srw signals. The srw communications may be based on any suitable short range wireless communications medium or system such as Bluetooth technology, near field communications (NFC).

In certain embodiments, for the location beacon system 12 with selective accuracy, a string of bits (STB), such as two p-bit strings, may be provided to intentionally degrade the beacon data or information that is provided to the users (e.g., users registered for lower accuracy navigation). For example, the STB may insinuate degradation into the mapping (e.g., mapping between beacon encoded identities and beacon locations as the permutation set forth in Table 1). That is the STB may be configured to insinuate degradation of the $\Pi_i$, $\Pi_{i+1}$, and so forth, such that each mapping of Table 1 may degrade (e.g., degraded mapping information) with time during each effective time interval (e.g., $T_i$, $T_{i+1}$, and so forth). The degradation may be generated in such a manner that the location beacon system 12 provides users registered for less accuracy navigation with mapping of slight variations, such as mappings that misidentify a subset of the beacon identities. For example, the degradations may be generated in a manner that the location beacon system 12 may provide users registered for less accuracy navigation with degraded mapping having less mapping information and/or missing some beacon identities. In certain embodiments, such a selective accuracy feature may be removed (e.g., the STB not used to insinuate degradation into the mapping), such as in an event of emergency.

As may be appreciated, the STB may also be viewed as a key or code to recover the mapping. For example, knowing the STB (e.g., knowing the intentionally introduced misidentification in beacon identities) may enable registered users (e.g., users registered for higher accuracy navigation) to recover the mapping. In certain embodiments, a plurality of STBs, corresponding to different levels of accuracy, may be provided to users based on a user's selection or choices. In certain embodiments, STBs may be used to provide any suitable number (e.g., one, two, three, four, five, or more) of different levels of navigation or location tracking accuracy.

For every time interval (e.g., $T_i$, $T_{i+1}$, and so forth), registered users may have access to STBs (e.g., $STB_i$ and $STB_{i+1}$) corresponding to their selected level of accuracy. In some embodiments, the STBs may be published or made accessible to the registered users on a website. Each $\Pi_i$, $\Pi_{i+1}$, and so forth, per effective time interval (e.g., $T_i$, $T_{i+1}$, and so forth) may include a p-bit string, $m_{i1}$, $m_{i2}$, . . . , $m_{ip}$. Each mapping of Table 1 is made into a "masked mapping" having a corresponding "interval mask" and STB. For example, each mapping of Table 1 is made into a masked mapping by combining the mapping with its associated interval mask and STB in a manner that the masked mapping may not be recovered or decoded without its associated interval mask and STB.

In some embodiments, the associated interval mask may be a random or pseudorandom p-bit string, $g_{i1}, q_{i2}, \ldots, q_{ip}$, produced by the controller 16, and the masked mapping effective during the time interval is formed by bit-by-bit exclusive-oring (XORing) of two p-bit strings to form a p-bit string $P=\{m_{i1} \oplus q_{i1}, m_{i2} \oplus q_{i2}, \ldots, m_{ip} \oplus q_{ip}\}$, where the binary operation $\oplus$ is the exclusive-or as defined in Table 1 with "0" indicating false and "1" indicating true. Table 2 illustrates that x exclusive-or (XOR) y outputs true whenever the inputs (e.g., x and y) are different.

TABLE 2

The Exclusive-Or Operation on Bits x and y.

| x | y | x $\oplus$ y |
|---|---|---|
| 0 | 0 | 0 |
| 0 | 1 | 1 |
| 1 | 0 | 1 |
| 1 | 1 | 0 |

Subsequently, the bit-by-bit exclusive-or (XOR) operation is performed bit-by-bit on the exclusive-oring P and the p-bit STB string. It may be appreciated that the linearity of the exclusive-or operation allows the mapping to be recovered or decoded by bit-by-bit exclusive-oring the masked mapping with its associated STB and then bit-by-bit exclusive-oring with the interval mask.

Figure 4:
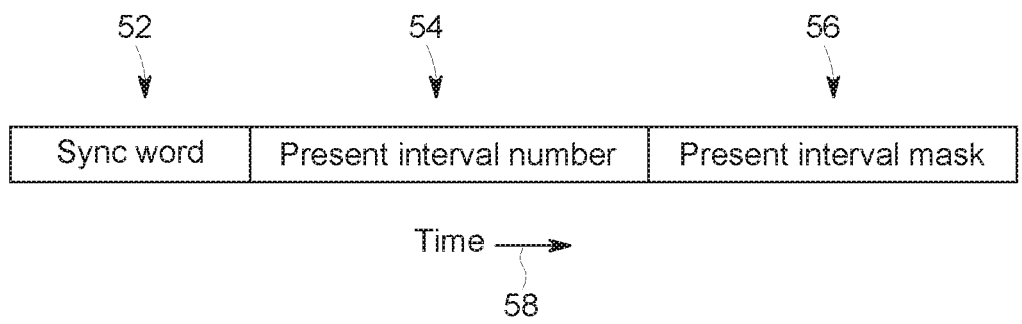
FIG. 4 is a chart illustrating an example sequence of the srw signal of FIG. 3 repeating with time, in accordance with an aspect of the present disclosure.

In addition to the "masked mapping" having a corresponding "interval mask" and STB, within each effective time interval (e.g., $T_i$, $T_{i+1}$, and so forth), the one or more registered receiver devices 18 may receive srw signals broadcasted by the one or more srw signal broadcast devices 50. In certain embodiments, the broadcasted srw signals may be a repeating sequence containing a synchronization word (SYNC word). For example, as illustrated in FIG. 4, the one or more srw signal broadcast devices 50 (e.g., second broadcasters) may each broadcast the SYNC word 52, a present interval number 54 (e.g., an interval number associated with a particular effective time interval), and a present interval mask 56 (e.g., an interval mask associated with a particular effective time interval) in sequence within the effective time interval 58. The SYNC word may be any sequence crafted for recognition, such as a Barker sequence and a high level link control (HDLC) flag. It may be desirable to avoid the SYNC word from fortuitously appearing in another part of the broadcasted message (e.g., the masked mapping) thereby insinuating a framing ambiguity. In some embodiments, the SYNC word may be broadcasted by any suitable techniques, such as bit stuffing and bit-escaping.

Figure 5:
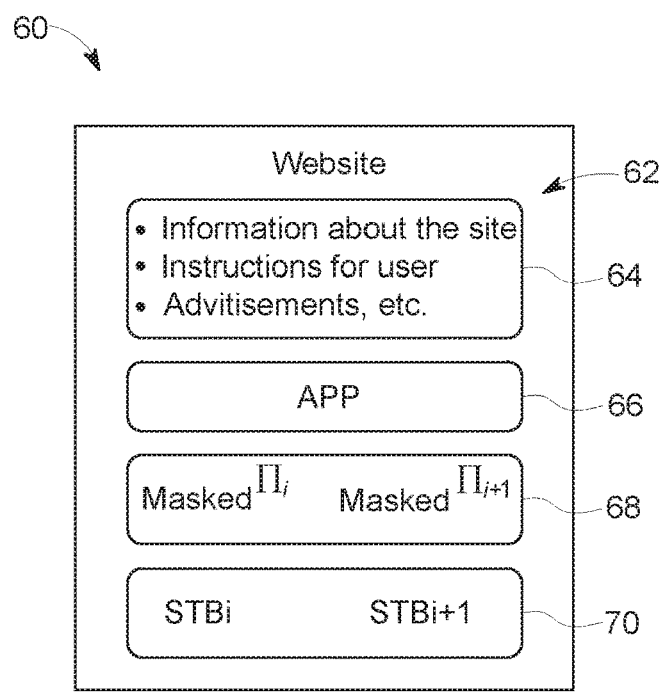
FIG. 5 is an example diagram of a website enabling registration to use the location beacon system of FIG. 1, in accordance with an aspect of the present disclosure.

Users who wish to use their devices (e.g., the one or more receiver devices 18) to navigate within the facility 10 with the aid of the beacon location system 12 may be registered with a website (e.g., registration and/or download APPs). FIG. 5 illustrates an example of such a website 60 that may in include one or more domains 62. In the illustrated embodiments, the website 60 may include a domain 64 that informs visitors or users about the website's purpose, provides instructions as to using the website 60, and may present advertisements (Ads) and/or any suitable communications that may be useful for the users. The website 60 may include a domain 66 that enables visitors or users to download APPs for utilizing the beacon location system 12.

For example, the APPs may allow a user (e.g., a user in good standing with a commercial retail establishment) having a registered device (e.g., the receiver device 18) to navigate within the facility 10 (e.g., the commercial retail establishment).

The website 60 may include a domain 68 that provides the masked mappings for the present and subsequent time intervals (e.g., the present masked mapping, Masked$^{\Pi_i}$, and a subsequent masked mapping, Masked$^{\Pi_{i+1}}$). The subsequent masked mapping may supplant or replace the present masked mapping when a notification is received by the receiver device 18 through srw signals broadcasted by the one or more srw broadcast devices 50 (e.g., second broadcasters). In other words, by providing the masked mappings for the present and subsequent time, the location beacon system 12 may facilitate transitions (e.g., seamless transitions) between mappings when the present time interval expires.

The website 60 may include a domain 70 that provides STBs for the present and subsequent time intervals (e.g., $STB_i$ and $STB_{i+1}$). As earlier discussed, the STBs may facilitate selective accuracy of the location beacon system 12. In certain embodiments, the domains 64, 66, and/or 68 may be publically available (e.g., accessible to any visitors or users of the website 60). In certain embodiments, the domain 70 may be accessible only to visitors or users who are in good standing with the facility 10 (e.g., a commercial retail establishment) to utilize the location beacon system 12 (e.g., without selective accuracy). In certain embodiments, the domain 70 may be accessible only to visitors or users who are registered for the location beacon system 12 having selective accuracy.

Figure 6:
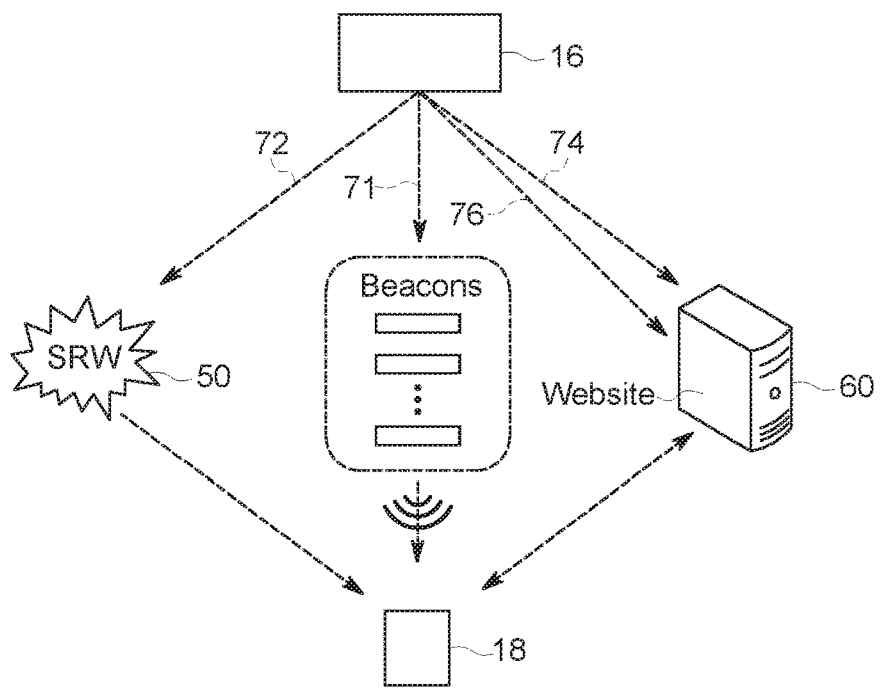
FIG. 6 is an example diagram illustrating routing of pieces of information of the location beacon system of FIG. 1, in accordance with an aspect of the present disclosure.

FIG. 6 is an example diagram illustrating routing of information of the location beacon system 12. In the illustrated embodiment, the controller 16 may control generation and/or communication of a first piece of information 71, a second piece of information 72, a third piece of information 74, and a fourth piece of information 76 to the receiver device 18 (e.g., a mobile phone, a smartphone). The first piece of information 71 may include encoded beacon identities of the one or more location beacons 14 (e.g., first broadcasters). The second piece of information 72 may include the present interval number and the present interval mask associated with the masked mappings, and may be communicated via the one or more srw broadcast devices 50 (e.g., second broadcasters). The third piece of information 74 may include the masked mappings (e.g., masked $\Pi_i$, $\Pi_{i+1}$, and so forth), and may be communicated via the website 60. The fourth piece of information 76 may include the STBs that facility the selective accuracy of the location beacon system 12, and may be communicated via the website 60.

In operation, while inside the facility 10, a user's device (e.g., the receiver device 18) may receive the encoded identities of the one or more location beacons 14 (e.g., first broadcasts). The user's device (e.g., the receiver device 18) may receive a broadcasted data sequence that may include the present interval number and the present interval mask associated with the masked mappings (e.g., second broadcasts). The user's device (e.g., the receiver device 18) may receive the masked mappings and the STBs (e.g., depending on the user's choice of selective accuracy). Based on these information, the user device (e.g., the receiver device 18) may utilize the location beacon system 12 during the effective time interval to navigate the user within the facility 10.

Figure 7:
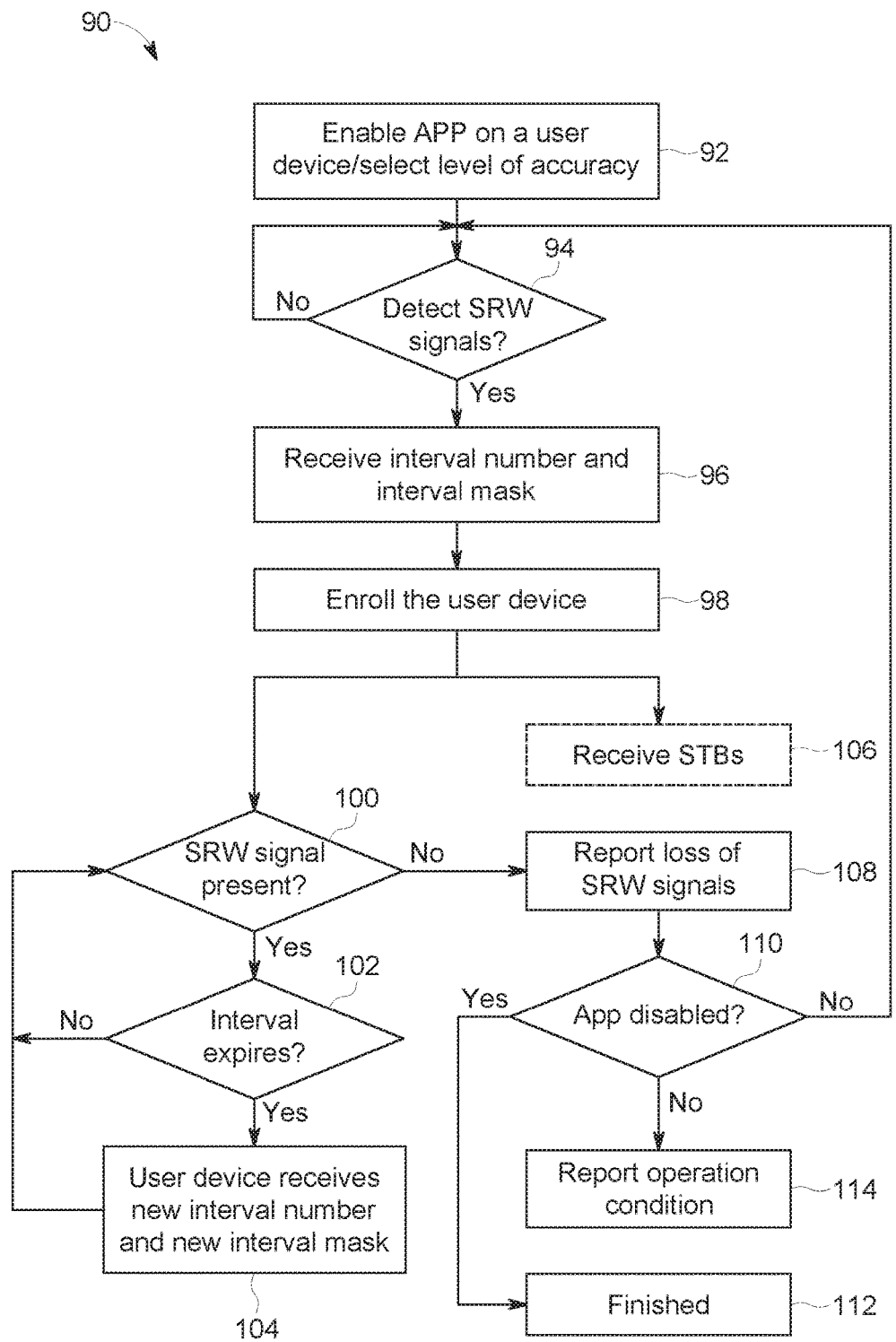
FIG. 7 is a flow chart illustrating a process for utilizing the location beacon system to provide location tracking with selective accuracy, in accordance with an aspect of the present disclosure.

FIG. 7 is a flow chart illustrating a method 90 for utilizing the location beacon system 12 to provide location or navigation to a user. One or more steps of the method 90 may be illustrated from the user having a user device (e.g., the receiver device 18, such as a mobile phone, a smartphone, or any suitable device having functionality to detect, receive, and process srw signals and signals broadcast by the one or more location beacons 14). The user may download and/or enable the APP downloaded from the website 60 prior to or about the time the user enters the facility 10 (step 92). As may be appreciated, at step 92, the user may also select level of accuracy (e.g., higher or lower navigation accuracy).

Once the APP is enabled, the user device (e.g., the receiver device 18) may detect the srw signals broadcasted by the one or more srw broadcast devices 50 (step 94). The branch marked "NO" exiting the step 94 and returning to step 94 repeats as the user device continues to look for the presence of the srw signals. As such, step 94 repeats until the srw signals are detected by the user device. For example, if the srw signals are not detected by the user device, step 94 may repeat as the user device continues to detect or listen to the presence of the srw signals. In certain embodiments, a time limit may be imposed such that step 94 may repeat only within the imposed time limit, and upon expiration of the imposed time limit, step 94 may be terminated and the APP may be disabled.

Once the srw signals are detected by the user device, the user device may receive the interval number and the interval mask from the one or more srw broadcast devices 50 (step 96). Subsequently, based on the received interval number and the interval mask, the user may enroll the user device to the location beacon system 12 (step 98). For example, upon receipt of the interval number and the interval mask, the user device may automatically communicate the interval number to the website 60, which may initiate or verify the enrollment of the user into the location beacon system 12.

The user device may continue monitoring and/or detecting the presence of srw signals (step 100). If the srw signals remain present, the user device may check for expiration of the effective interval (step 102). If the effective interval has not expired, the user device may continue to detect srw signals including interval number and interval mask (step 100). If the effective interval has expired, the user device may receive a new interval number and a new interval mask (step 104). In addition, if the user has selected a higher level of accuracy (e.g., at step 92), the user device may access or receive a corresponding STB for the present effective interval (step 106). The STBs for the present interval and subsequent interval may be posted on the website 60 (e.g., domain 70). It should be noted that step 106 is omitted if the selective accuracy feature is removed, such as in an event of emergency.

However, if at step 100, the srw signals are no longer present, the user device may report loss of srw signals (step 108). For example, the user device may communicate with the website 60 to report the loss of the srw signals. Subsequently, the website 60 may communicate with the controller 16 to unsubscribe or de-enroll the user from the location tracking system 12. Further, the method 90 may include examining the status of the APP (step 110). If the APP is disabled, such as by the user, the engagement of the user device with the location beacon system 12 may terminate (step 112). However, if the APP is still enabled, the method 90 may proceed to step 94 and the subsequent steps, where the user device continues to detect the srw signals broadcasted by the one or more srw broadcast devices 50.

In some embodiments, if the srw signals are lost, but the APP is still enabled, the method 90 may communicate with the website 60 to report an operation condition (step 114). For example, the user device may communicate with the website 60 to report its last position as determined by the location beacon system 12. This reporting may assist the location beacon system 12 in detecting and/or locating dead spots in the reception of the srw signals. For example, the user device may communicate with the website 60 and report a record of measured srw strength as a function of the navigation path within the facility 10. This reporting may assist the location beacon system 12 in planning the positioning and/or repositioning of the srw broadcast devices 50 to improve coverage or effective signal communication. As may be appreciated, step 110 may occur prior to, substantially simultaneously, or subsequent to proceeding to step 94.

Figure 8:
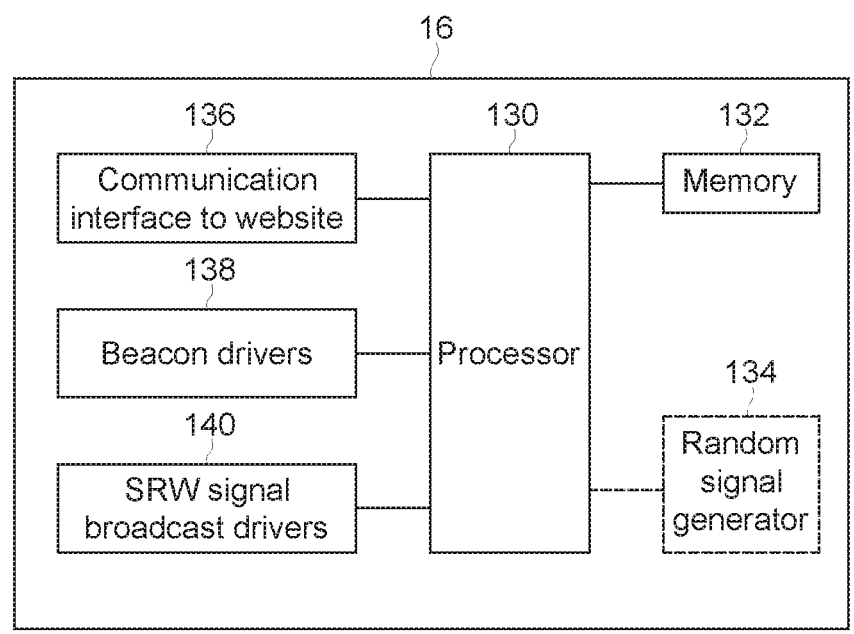
FIG. 8 is a block diagram of a controller of the location beacon system of FIG. 1, in accordance with an aspect of the present disclosure.

FIG. 8 is a block diagram of the controller 16 that is operatively coupled to the one or more location beacons 14 and communicatively coupled to the website 60. The controller 16 may control the operation of the location beacon system 12, such as generating and communicating encoded beacon identity to the one or more location beacons 14, generating the mappings and the STBs, receiving and storing user registration data, etc. The website 60 coupled to the controller 16 may communicate mapping information and STBs based at least in part on instructions of the controller 16. In the illustrated embodiment, the controller 16 may include a processor 130 and a memory 132 communicatively coupled to the processor 130. The processor 130 may include one or more application specific integrated circuits (ASICs), one or more field programmable gate arrays (FPGAs), one or more general purpose processors, or any combination thereof. Furthermore, the term processor is not limited to just those integrated circuits referred to in the art as processors, but broadly refers to computers, processors, microcontrollers, microcomputers, programmable logic controllers, application specific integrated circuits, and other programmable circuits. The memory 132 (e.g., a non-transitory computer-readable medium/memory circuitry) may include volatile memory, such as random access memory (RAM), and/or non-volatile memory, such as read-only memory (ROM), optical drives, hard disc drives, or solid-state drives. The memory 132 may store data or information, algorithm(s), and one or more sets of instructions (e.g., processor-executable instructions) implemented to perform operations related to the location tracking system 12. For example, the memory 132 may store a map or layout of the facility 10 (e.g., including coordinates or locations of the one or more location beacons 14 and of the one or more srw signal broadcast devices 50). For example, the memory 132 may store a layout and/or a list of hosting including an in-store presence directory.

The controller 16 may include a random signal generator 134 that is operably coupled to the processor 130. The random signal generator 134 may be any suitable device or mechanism configured to generate random signals and/or numbers. The processor 130 may occasionally generate or create numbers that are not predictable by un-authorized user(s) or interloper(s) using the random signal generator 134. The random numbers may be pseudorandomly generated with an underlying determinism, such as by a software pseudorandom number generator, and/or generated by a hardware module (e.g., at least one hardware random signal generator) that generates noises, such as thermal noise digitization and back-biased diode currents.

The controller 16 may include a communication interface 136 operably coupled to the processor 130 and enables the controller 16 to connect or communicate to a website (e.g., website 60). The controller 16 may include one or more beacon drivers 138 operably coupled to the processor 130 and enable the controller 16 to control the one or more location beacons 14. The one or more beacon drivers 138 may include one or more electrical switches. The controller 16 may include one or more srw signal broadcast drivers 140 operably coupled to the processor 130 and enable the controller 16 to control the one or more srw signal broadcast devices 50.

Figure 9:
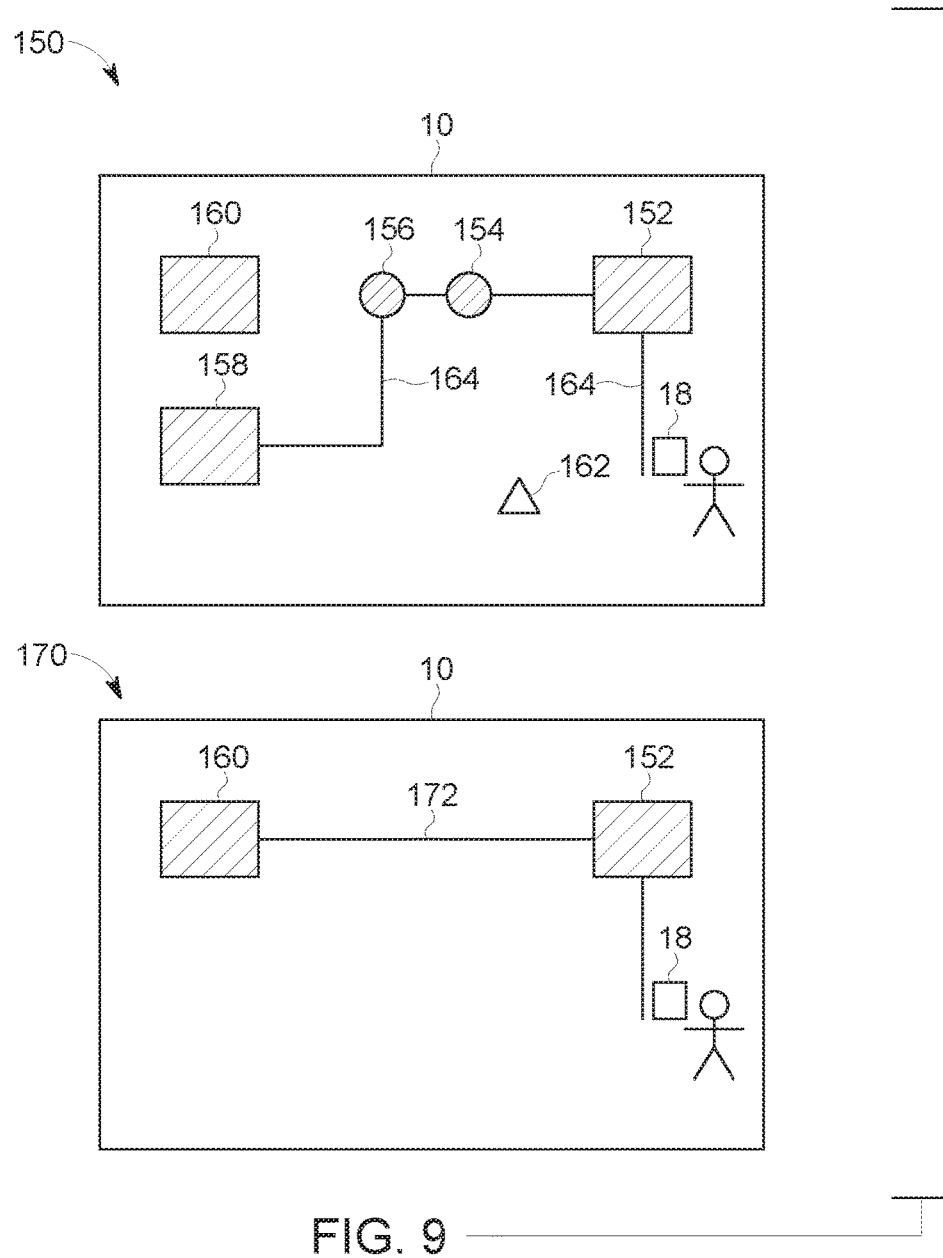
FIG. 9 is an example diagram illustrating a comparison between users navigating within a facility having selected

FIG. 9 illustrates an example of comparison between user navigation of different levels of accuracies. It should be noted that while only two levels of accuracy are illustrated, there may be any suitable number of levels of accuracy. In the illustrated embodiment, a diagram 150 represents navigation received by a user registered for a high accuracy navigation, and a diagram 170 represents navigation received by a user registered for a low accuracy navigation. In the diagram 150, the user may use the user device (e.g., receiver device 18) to navigate within the facility 10. Enabled by the APP downloaded to the user device, the location beacon system 12 may show suggested visits 152, 154, 156, 158, 160, and 162 (e.g., stores, business units, shops, items, etc.) to the user. The location beacon system 12 may also suggest a route of travel 164. For example, the suggested visits 152, 158, and 160 may be a first type of units, the suggested visit 154 and 156 may be a second type of units, and the suggested visit 162 may be a third type of units. For example, the second type of units may be providing promotions (e.g., sales, coupons, discounts). For example, the third type of units may be relatively difficult to find. It may be appreciated that the user registered for higher accuracy navigation may have access to navigation to more types of units (e.g., the first, second, and third types) and the corresponding route of travel. In contrast, as shown in the diagram 170, the location beacon system 12 may only show suggested visits 152 and 160 and a corresponding route 172 to the user. As such, the user registered for lower accuracy navigation may have access to navigation to fewer types of units (e.g., the first type) and the corresponding route of travel.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A beacon location system comprising:
a plurality of first broadcasters configured to broadcast first broadcasts to be received by a registered receiver device;
one or more second broadcasters configured to broadcast second broadcasts to be received by the registered receiver device;
a controller positioned external to the plurality of first broadcasters and the one or more second broadcasters and communicatively and operatively coupled to the plurality of first broadcasters, and the one or more second broadcasters, wherein the controller comprises a memory and a processor configured to execute instructions stored on the memory comprising instructions for:
generating one or more masked correspondences between the first broadcasts and locations of the plurality of the first broadcasters, wherein the one or more masked correspondences comprise one or more levels of accuracies;
controlling operation of the plurality of first broadcasters; and
controlling operation of the one or more second broadcasters; and
a website accessible to the registered receiver device to obtain the one or more masked correspondences.

2. The beacon location system of claim 1, wherein the registered receiver device selects one of the one or more levels of accuracies upon registration with the website, wherein a higher level of accuracy corresponds to more precise navigation.

3. The beacon location system of claim 1, wherein the plurality of first broadcasters comprise location beacons, and the first broadcasts comprise optical signals, radio frequency (RF) signals, audio signals, or a combination thereof.

4. The beacon location system of claim 1, wherein the one or more second broadcasters comprise short range wireless (srw) broadcast devices, and the second broadcasts comprise optical signals, RF signals, audio signals, or a combination thereof.

5. The beacon location system of claim 1, wherein the second broadcasts each comprises a data sequence used in forming the one or more masked correspondences.

6. The beacon location system of claim 5, wherein the data sequence is generated by the controller using a hardware random signal generator and/or a software pseudorandom generator.

7. The beacon location system of claim 1, wherein the one or more masked correspondences comprise one or more present masked correspondences or one or more subsequent masked correspondences, wherein the one or more present masked correspondences are effective within a time interval and are replaced by the subsequent masked correspondences upon a notification broadcasted by the one or more second broadcasters.

8. The beacon location system of claim 1, wherein the plurality of first broadcasters, the one or more second broadcasters, and the controller are located within an indoor facility.

9. The beacon location system of claim 1, wherein each of the plurality of first broadcasters is disposed in a ceiling or on a light fixture.

10. The beacon location system of claim 1, wherein the registered device is a mobile phone.

11. A method for providing location comprising:
providing a plurality of location beacons configured to broadcast first signals to be received by one or more registered receiver devices;
providing one or more broadcasters configured to broadcast second signals to be received by the one or more registered receiver devices;
providing a controller positioned external to the plurality of location beacons and the one or more broadcasters and operatively coupled to the plurality of location beacons and the one or more broadcasters;
providing a website communicatively coupled to the controller and accessible to the one or more registered receiver devices; and
generating one or more masked correspondences between the first signals and locations of the plurality of location beacons, wherein the one or more masked correspondences comprise one or more levels of accuracies and are obtainable by the one or more registered receiver devices through the website.

12. The method of claim 11, comprising providing a key obtainable by the one or more registered receiver devices through the website based on a user selected one or more levels of accuracies, wherein the key enables to recover the one or more masked correspondences.

13. The method of claim 11, comprising using the controller to generate a data sequence via at least one hardware random signal generator and a software pseudorandom generator, to form the one or more masked correspondences.

14. The method of claim 11, wherein the one or more masked correspondences comprise a present masked correspondence and a subsequent masked correspondence.

15. The method of claim 14, comprising replacing the present masked correspondence with the subsequent masked correspondence upon expiration of an effective time interval of the present masked correspondence.

16. The method of claim 11, comprising generating a notification using the one or more broadcasters when one of the one or more masked correspondences expires.

17. A location beacon controller, comprising:
 a memory encoding one or more processor-executable routines; and
 a processor positioned external to a plurality of first broadcasters and one or more second broadcasters and programmed to access and execute the one or more routines encoded by the memory, wherein the routines, when executed, cause the processor:
  to broadcast first broadcasts via the plurality of first broadcasters;
  to broadcast second broadcasts via the one or more second broadcasters; and
  to generate one or more masked correspondences between the first broadcasts and the locations of the plurality of the first broadcasters, wherein the one or more masked correspondence comprise a present masked correspondence that is effective within a time interval and is replaced by a subsequent masked correspondence upon a notification broadcasted by the one or more second broadcasters when the time interval expires, wherein the one or more masked correspondences comprise one or more levels of accuracies.

18. The location beacon controller of claim 17, wherein the location beacon controller is located within an indoor facility.

19. The location beacon controller of claim 17, wherein the location beacon controller is communicatively coupled to a website to provide the one or more masked correspondences to one or more registered receiver devices based on a user selected one or more levels of accuracies.

20. The location beacon controller of claim 17, wherein the processor is programmed to generate a data sequence used in forming the one or more masked correspondences, wherein the data sequence is generated using a hardware random signal generator and/or a software pseudorandom generator.

* * * * *